US006204752B1

(12) United States Patent
Kishimoto

(10) Patent No.: US 6,204,752 B1
(45) Date of Patent: Mar. 20, 2001

(54) BICYCLE DISPLAY UNIT WITH BACKLIGHT

(75) Inventor: Hitoshi Kishimoto, Sakai (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 09/448,421

(22) Filed: Nov. 24, 1999

(51) Int. Cl.[7] .................................................. B62J 3/00
(52) U.S. Cl. .......................... 340/432; 340/439; 340/441; 340/456; 340/465; 340/438; 368/10; 368/69; 368/70; 368/82; 368/262
(58) Field of Search .................................. 340/432, 439, 340/441, 438, 456, 465, 561, 601; 345/102, 63, 211; 600/500, 502, 503; 368/1, 10, 262

(56) References Cited

U.S. PATENT DOCUMENTS

| 3,898,563 | 8/1975 | Erisman | 324/166 |
|---|---|---|---|
| 4,352,063 | 9/1982 | Jones et al. | 324/171 |
| 4,633,216 | * 12/1986 | Tsuyama | 340/134 |
| 4,636,769 | 1/1987 | Tsuyama | 340/134 |
| 4,887,249 | 12/1989 | Thinesen | 368/10 |
| 5,313,225 | * 5/1994 | Miyadera | 345/102 |
| 5,370,412 | 12/1994 | Chou | 280/288.4 |
| 5,621,382 | * 4/1997 | Yamamoto | 340/432 |
| 5,625,336 | * 4/1997 | Yamamoto | 340/432 |
| 5,629,668 | * 5/1997 | Downs | 340/432 |
| 5,696,483 | 12/1997 | Khalid et al. | 340/456 |
| 5,796,350 | 8/1998 | Fuse | 340/815.75 |
| 5,829,878 | * 11/1998 | Weiss et al. | 374/163 |
| 5,847,641 | 12/1998 | Jinbo | 340/432 |
| 5,854,617 | * 12/1998 | Lee et al. | 345/102 |
| 5,886,623 | 3/1999 | Jinbo et al. | 340/432 |
| 5,900,705 | 5/1999 | Kimura | 318/286 |
| 5,903,214 | 5/1999 | Watarai | 340/432 |
| 5,909,672 | * 1/1999 | Madore et al. | 705/32 |
| 5,921,139 | 7/1999 | Yamane | 74/473.13 |

FOREIGN PATENT DOCUMENTS

| 0629860A | 12/1994 | (EP) . |
|---|---|---|
| 0641711B | 4/1997 | (EP) . |
| 667158 | 9/1994 | (JP) . |

* cited by examiner

Primary Examiner—Jeffery Hofsass
Assistant Examiner—Hung Nguyen
(74) Attorney, Agent, or Firm—Shinjyu Global IP Counselors

(57) ABSTRACT

A bicycle display unit is provided for displaying information to the rider. The bicycle display unit is preferably part of a bicycle computer that is battery operated. The bicycle display unit has a display panel with a front display surface and a backlight arranged to illuminate the front display surface for viewing the information displayed thereon. The battery is electrically coupled to the backlight to supply electrical energy thereto. The bicycle display unit also has a backlight switch command operatively coupled between the backlight and the battery to selectively turn the backlight "on" and "off", and a control unit that extends the life of the battery by controlling the illumination of the backlight. The backlight switch command turns "on" the backlight upon receiving a predetermined operational command. The predetermined operational command can be a pre-selected time period, a shifting operation, a mode change, etc. Also the control unit is operatively coupled to the backlight switch command to automatically turn "off" the backlight upon lapse of a predetermined time period after switching the backlight to be turned "on". The backlight is preferably turned "on" for predetermined time period of less than 30 seconds. Preferably, the control unit prevents the backlight from being turned "on" that during selected hours, such as daylight hours, even if a predetermined operational command is received. A measuring device is preferably connected to the display unit to output the information on the display panel, such as bicycle speed, distance traveled, lap time, running time, current time, rider cadence, torque applied to the bottom bracket axle and shift position of the shifting mechanism.

22 Claims, 9 Drawing Sheets

BICYCLE DISPLAY UNIT WITH BACKLIGHT

BACKGROUND OF THE INVENTION

1. Field of the Invention

This invention generally relates to a bicycle display unit with a battery operated backlight. More specifically, the present invention relates a bicycle display unit with at least one backlight that illuminates a front display panel in an energy efficient manner.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, it is advantageous for modern cyclists to know how fast they are going. Thus, speedometer type devices for bicycles have become an increasingly popular add-on type of item. In fact, some bicycles are often sold with a device for indicating the speed of the bicycle.

Early forms of these speedometer devices were mechanically operated. These early speedometer devices typically just indicated the current speed of the bicycle and/or the miles traveled by the bicycle. These early speedometer devices also had various mechanical disadvantages. One source of difficulty was the means by which the speedometer device sensed that the wheel had rotated. Many speedometers attached a counting device that protruded from the spoke, and would advance a gear or a counter every time the wheel rotated. But these devices were not reliable and subject to breakdown. This led to inductive-type sensors, which did away with the requirement of actual contact between spoke-attachment and sensor.

Moreover, with technological advances in computers and electronics, the mechanical devices were replaced with electronic devices that provide much more information than just the speed of the bicycle and/or the miles traveled by the bicycle. These electronic devices have become known as bicycle computers, which include various sensors that are coupled to a display panel or member. The bicycle computer can often times measure, calculate and display various parameters such as bicycle speed, distance traveled, lap time, running time, current time, rider cadence, torque applied to the bottom bracket axle and shift position of the shifting mechanism. These bicycle computers can also sometimes provide information on the rider such as the rider's pulse, blood pressure and other parameters.

The display member or panel for the bicycle computer usually utilizes a liquid crystal display (LCD) since it is easy for the rider to read during normal daylight riding conditions. However, such displays are often difficult, if not impossible, to read during evening or nighttime hours. Accordingly, some bicycle computers have display members or panels that include a light for illuminating the display panel or member during nighttime hours. Usually, the rider pushes a button that activates the light. Once the rider releases the button, the light is extinguished. One problem with this type of arrangement is that the rider must perform a separate function in order to view the information on the display. Moreover, the lights are typically inefficient and cause a significant drain on the battery life. Moreover, these buttons can be accidentally hit during daylight hours in which the battery is needlessly used. Accordingly, it is desirable to have a bicycle computer that does not require the rider to push a button to merely see the display during night riding or low light conditions. Moreover, it is desirable to have a light for the display that minimizes unnecessary or accidental use of the light to save energy of the battery.

In view of the above, there exists a need for a bicycle display unit with a battery operated backlight which overcomes the above mentioned problems in the prior art. This invention addresses this need in the prior art as well as other needs, which will become apparent to those skilled in the art from this disclosure.

SUMMARY OF THE INVENTION

One object of the present invention is to provide a bicycle display unit with a battery operated backlight that extends the life of the battery.

Another object of the present invention is to provide a bicycle display unit with backlight that prevents operation during selected hours.

The foregoing objects can basically be attained by providing a bicycle display unit having a display member, a backlight, a backlight switch command and a control unit. The backlight is arranged to illuminate the display member for viewing the display member. The backlight switch command is operatively coupled to the backlight to selectively turn the backlight "on" and "off". The backlight switch command turns "on" the backlight in response to a predetermined operational command. The control unit is operatively coupled to the backlight switch command to automatically turn "off" the backlight upon lapse of a predetermined time period after switching the backlight to be turned "on". The predetermined time period is preferably less than 30 seconds. The control unit prevents the backlight from being turned "on" during a selected time interval even if the predetermined operational command is received.

Preferably, the display member is a liquid crystal display (LCD) or the like. The display member has a display surface for displaying information and the backlight is arranged to indirectly illuminate the front display surface for viewing the information displayed thereon.

Preferably, the bicycle display unit of the present invention further includes one or more measuring devices connected to the display member to output information on the display member. The measuring device can include a timing device that produces the predetermined operational command that is sent to the backlight switch command to turned "on" the backlight for a predetermined time period. One of the measuring devices is preferably a speed determining component.

Preferably, the bicycle display unit of the present invention further includes a battery unit electrically coupled to the backlight to supply electrical energy thereto.

In selected embodiments of the present invention, the display member and the backlight are mounted to a housing, which has a mounting member.

Preferably, the control unit of the bicycle display unit of the present invention further includes a microprocessor. The control unit is operatively coupled to a bicycle shifting assembly that produces the predetermined operational command during a shifting operation to signal the backlight to be turned "on". The bicycle shifting assembly includes at least one shifting member with the predetermined operational command being produced by operation of the at least one shifting member.

The bicycle display unit of the present invention is preferably integrated with a bicycle shifting assembly operatively coupled to the control unit to display shifting information on the display member. The bicycle shifting assembly includes at least one shifting member. The display member, the backlight and the bicycle shifting assembly are mountable on a bicycle. For example, the shifting member, the backlight, the display member and the bicycle shifting assembly are mounted together in a housing that mounts on the handlebar of the bicycle. In one embodiment, the control unit is mounted together with the backlight and the display member in a single unit that is mounted on the handlebar of the bicycle. Alternatively, the backlight and the display member can be mounted together in a first housing, while the control unit can be mounted in a second housing.

In selected embodiments, the bicycle shifting assembly can be part of an automatic transmission that has a manual mode and at least one automatic mode. In the manual mode, the rider manually performs the shifts. In the automatic mode, the gears are automatically shifted. In either case, each shift produces a predetermined operational command that is sent to the control unit. In such a bicycle shifting assembly, the control unit can be operatively coupled to the bicycle shifting assembly such that a mode changing operation produces the predetermined operational command.

The control unit preferably has an adjustment to change the length of the selected time interval. The selected time interval of the control unit can also be factory preset. The preferred range for the predetermined time period is between about one second and about six seconds.

The foregoing objects can also be attained by performing the method of displaying information to a bicycle rider in low lighting situations such that operation of the backlight conserves energy of the battery. Basically, the method of the present invention comprising the steps of displaying the information on a display that is provided with a battery operated backlight to illuminate the information displayed on the display, and selectively turning the backlight "on" and "off" for a predetermined time period of less than 30 seconds in response to predetermined operational command. The backlight is prevented from operating during a predetermined blackout period.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
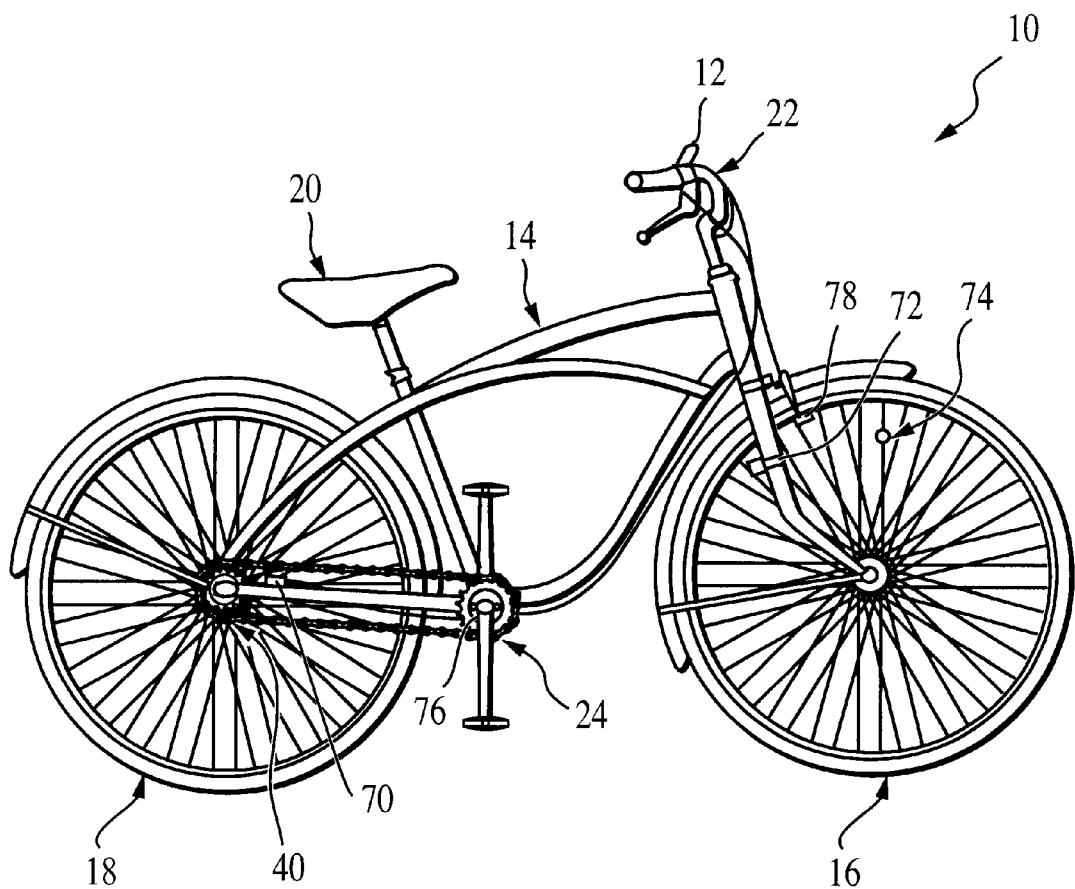
FIG. 1 is a side elevational view a bicycle with a bicycle display unit installed thereon in accordance with the present invention.

Referring initially to FIG. 1, a bicycle 10 is illustrated with a bicycle display unit 12 of one embodiment of the present invention installed thereon as discussed below. The bicycle display unit 12 is preferably a bicycle computer, which can measure, calculate and display various parameters pertaining to the bicycle 10, such as bicycle speed, distance traveled, lap time, running time, current time, rider cadence, torque applied to the bottom bracket axle and gear positions. The bicycle computer or display unit 12 can also provide information on the rider such as the rider's pulse, blood pressure and other parameters if desired. Bicycle display unit 12 is especially designed to display information to a bicycle rider in low lighting situations while conserving energy as explained below.

Bicycle 10 is preferably a conventional bicycle with a bicycle frame 14 with a front wheel 16, a rear wheel 18, a seat 20, a handlebar 22 and a drive train component 24 for propelling bicycle 10. Bicycle 10 and its various components are well known in the art. Thus, bicycle 10 and its various components will not be discussed or illustrated in detail herein except as needed to explain the present invention. Moreover, in the first illustrated embodiment, display unit 12 is also used to shift drive train component 24, which is an automatic transmission. Of course, it will be apparent to those skilled in the art that display unit 12 can be used in conjunction with a manual shifted drive train component.

Figure 2:
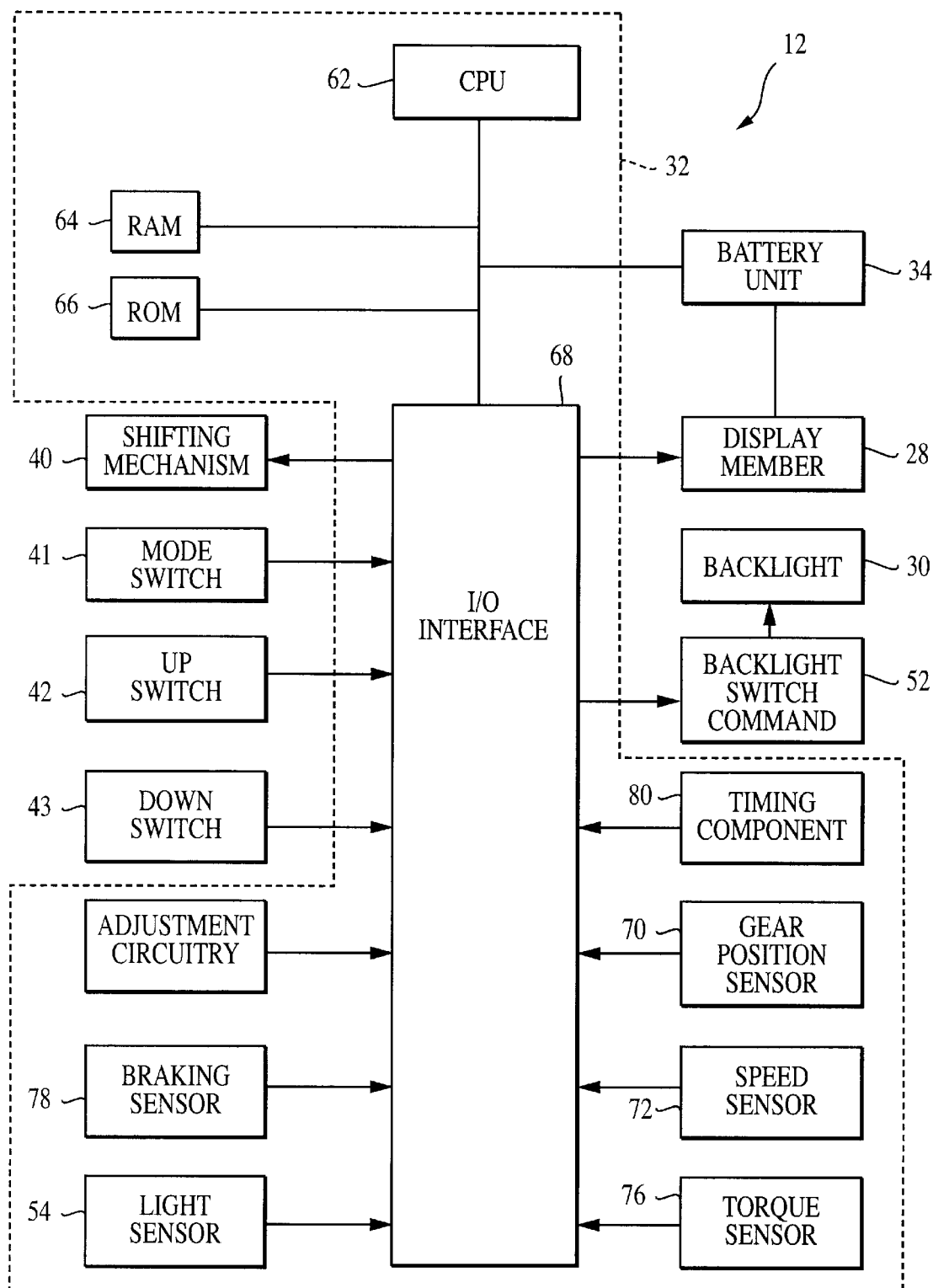
FIG. 2 is a schematic illustration of the bicycle display unit in accordance with the present invention.
Figure 3:
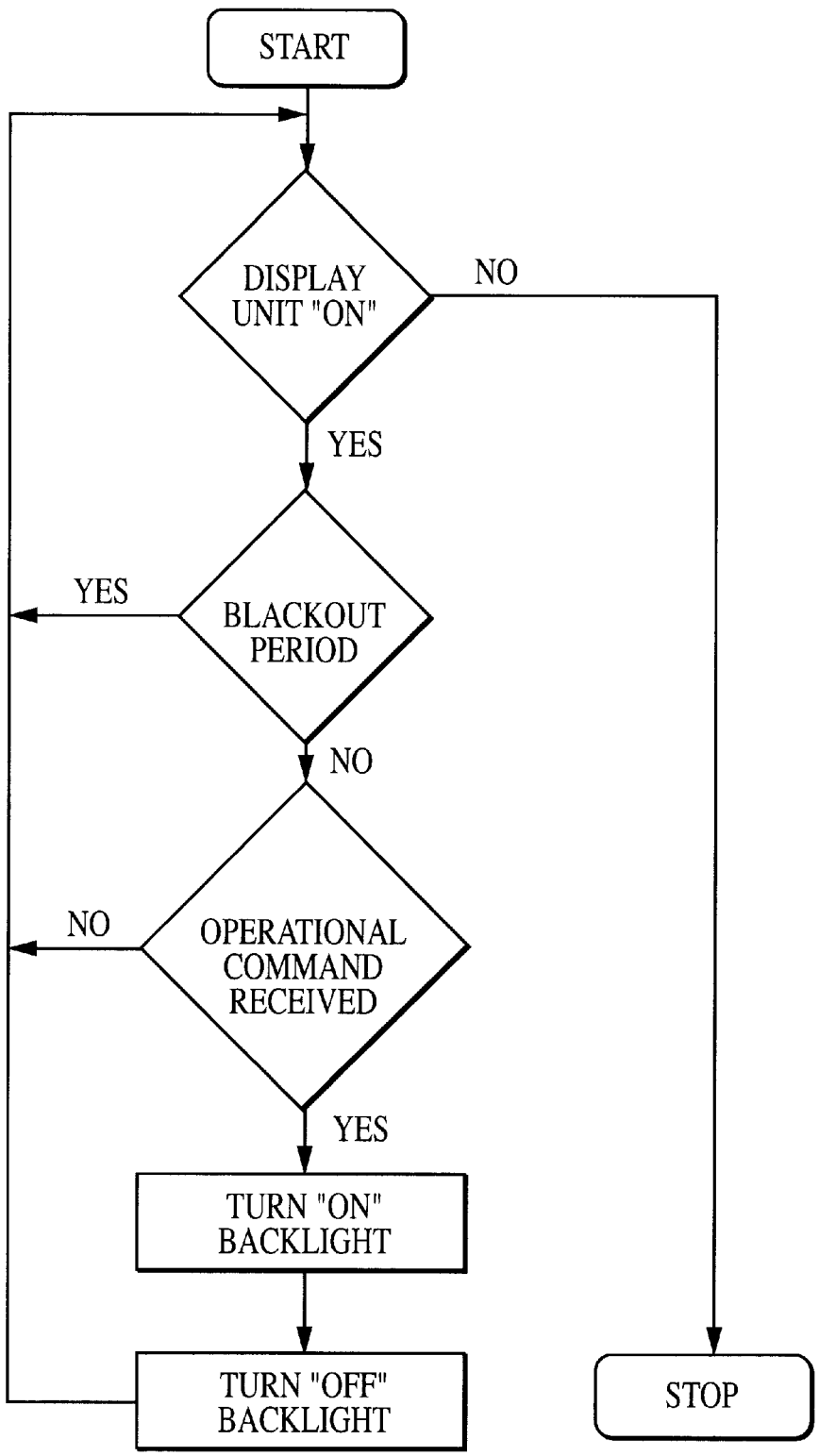
FIG. 3 is a flowchart showing an example of a process for tuning "on" the backlights for the display unit in accordance with the present invention.
Figure 8:
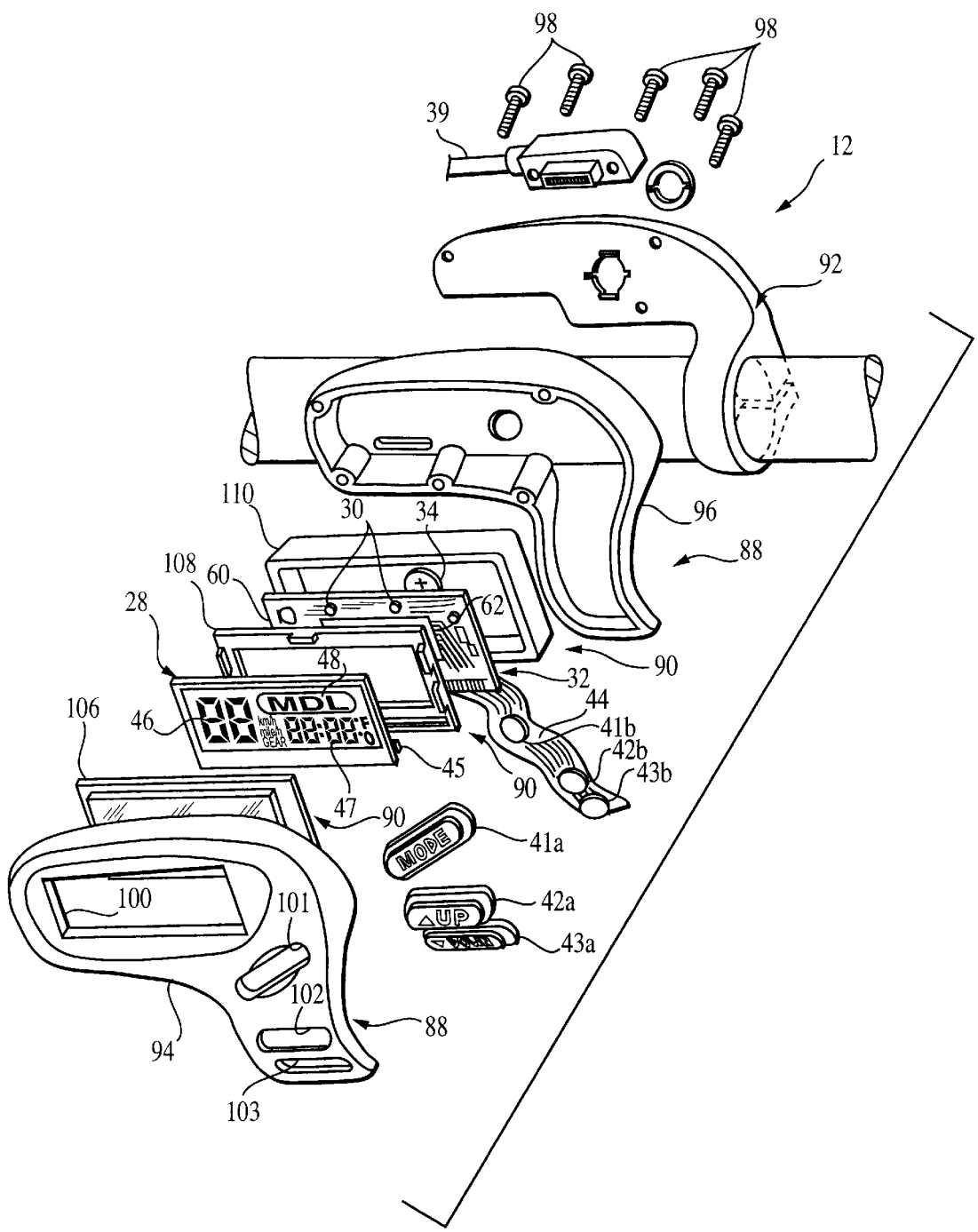
FIG. 8 is an exploded perspective view of the bicycle display unit illustrated in FIGS. 4–7 in accordance with the present invention.
Figure 9:
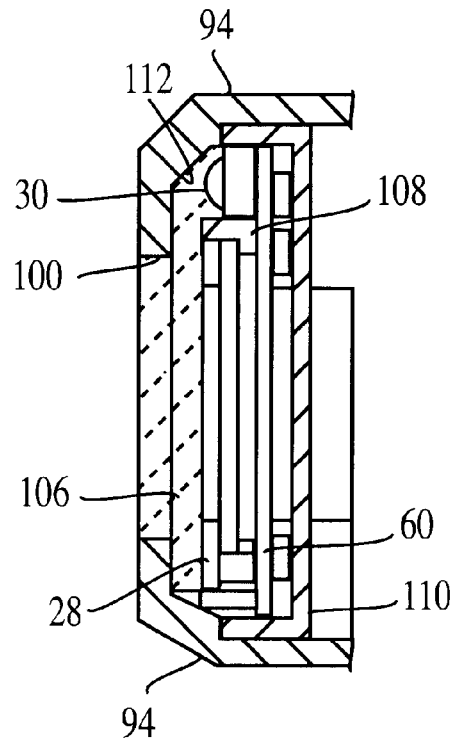
FIG. 9 is a transverse cross-sectional view of the display unit illustrated in FIGS. 4–8 as seen along section line 9—9 of FIG. 5.
Figure 10:
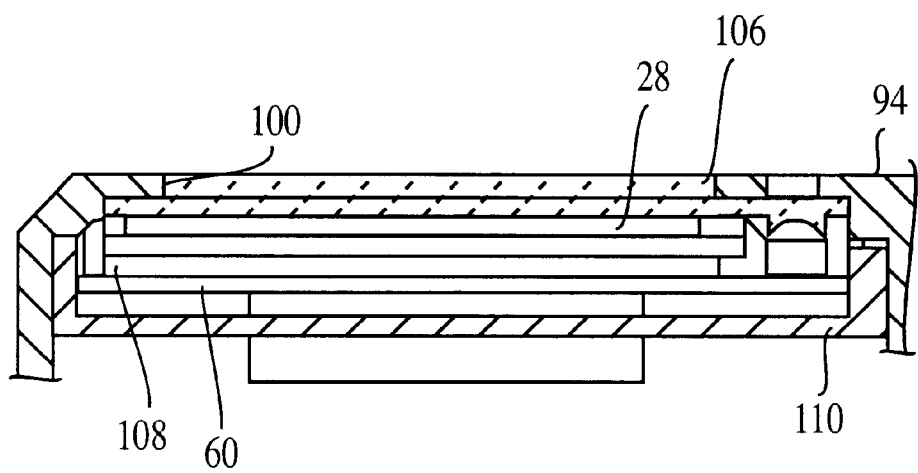
FIG. 10 is another cross-sectional view of the display unit illustrated in FIGS. 4–8 as seen along section line 10—10 of FIG. 5.
Figure 11:
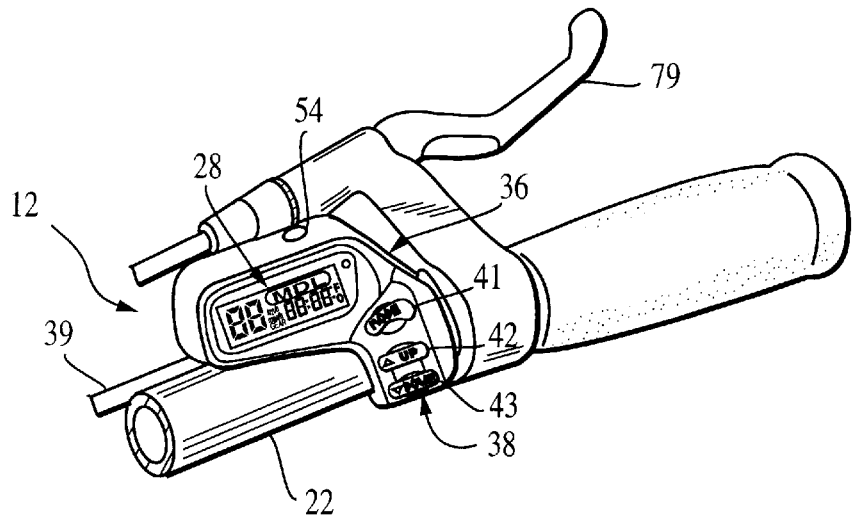
FIG. 11 is a perspective view of the display unit in accordance with the first embodiment of the present invention coupled adjacent to the brake device.

As best seen in FIGS. 2 and 8, bicycle display unit 12 basically includes a display panel or member 28 with a pair of backlights 30, a control unit or component 32 and a battery unit or component 34, which are all mounted together in a housing 36. Preferably, bicycle display unit 12 is fixedly mounted on a portion of handlebar 22 that is adjacent one of the hand grips. In the illustrated embodiment, bicycle display unit 12 is part of a shifting assembly 38 that is operatively coupled to a drive train component 24.

Figure 12:
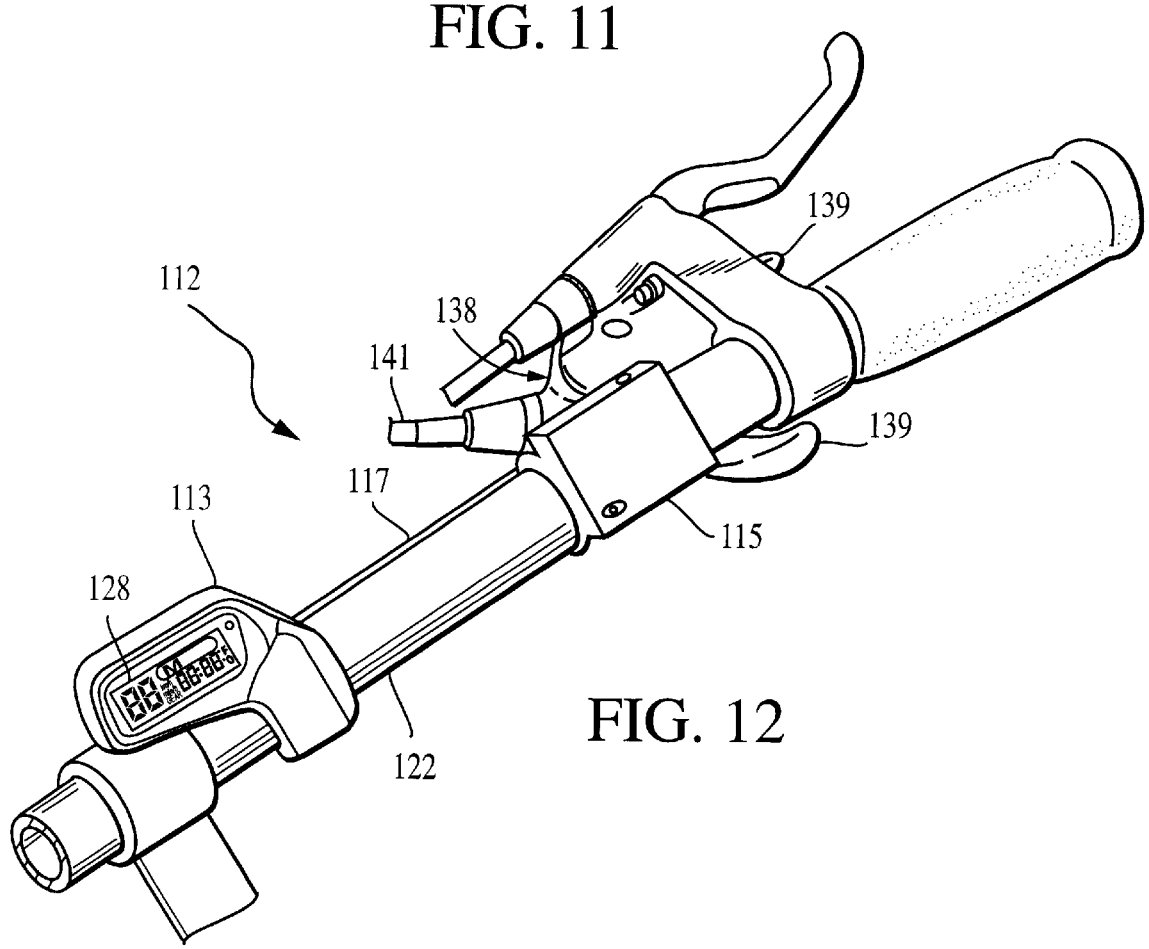
FIG. 12 is a perspective view of a display unit in accordance with a second embodiment of the present invention.
Figure 13:
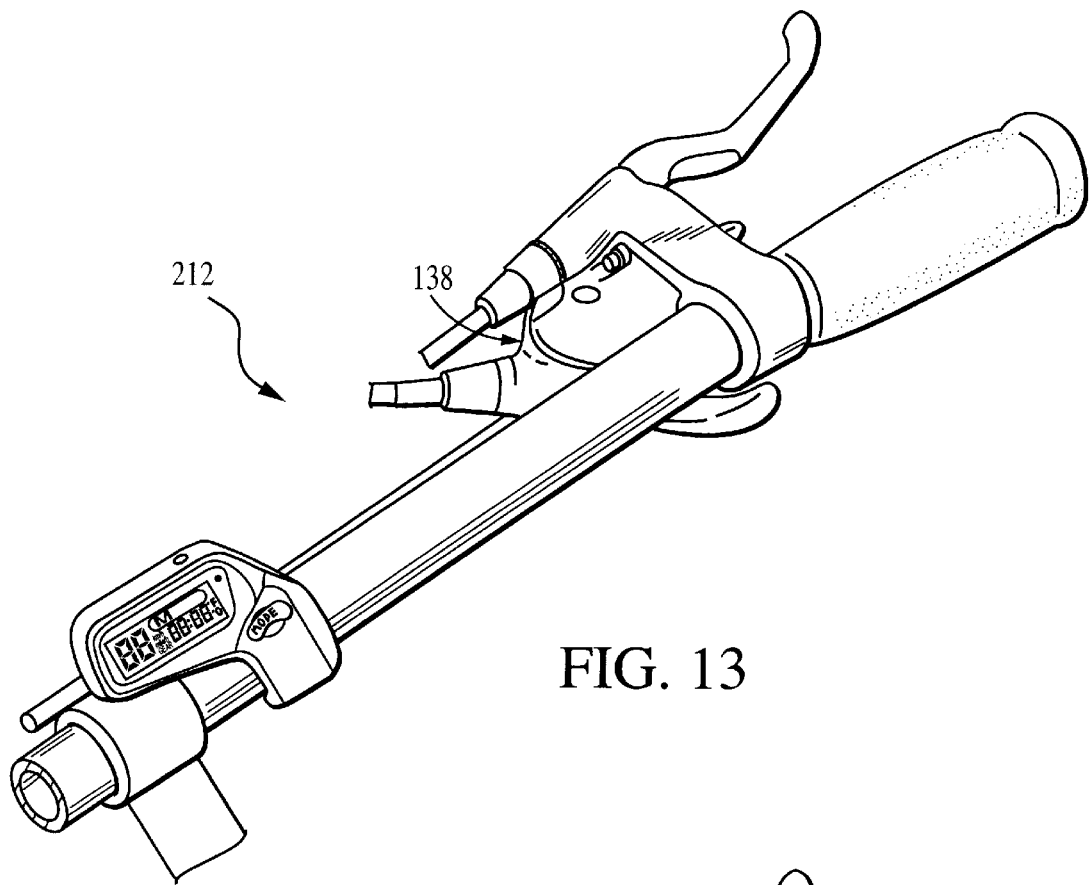
FIG. 13 is a perspective view of a display unit in accordance with a third embodiment of the present invention.
Figure 14:
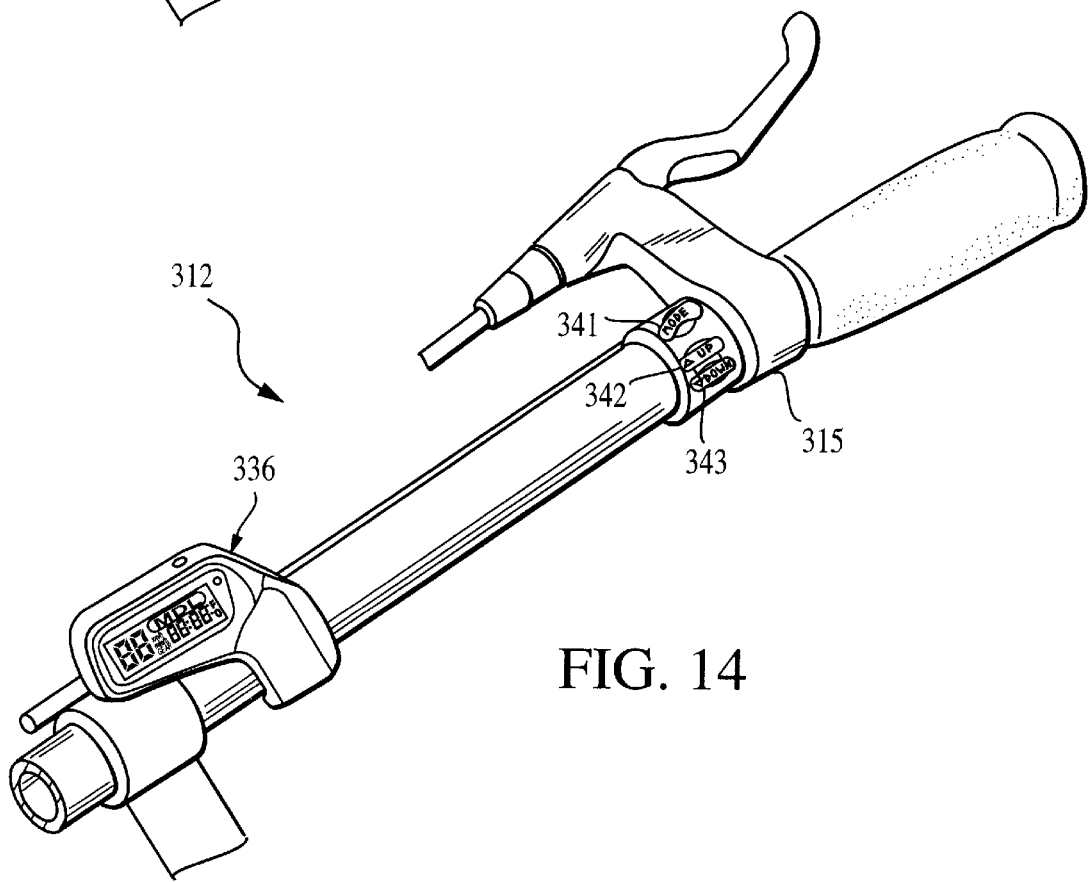
FIG. 14 is a perspective view of a display unit in accordance with a fourth embodiment of the present invention.

Of course, it will be apparent to those skilled in the art from this disclosure that other embodiments are possible, some of which are disclosed herein. For example, as seen in FIG. 12, control unit 32 can be physically separated from display panel 28 such that display panel 28 is mounted at the center of the handlebar 22, while control unit 32 is located adjacent the hand grip. Moreover, bicycle display unit 12 can be separate from shifting assembly 38 as seen in FIGS. 13 and 14.

In the illustrated embodiment, shifting assembly 38 is operatively connected by a shift cable 39 to a multi-speed internal shifting hub 40 that mounts the rear wheel 18 to frame 14. Of course, it will be apparent to those skilled in the art from this disclosure that other types of shifting assemblies and drive train components may be utilized in connection with display unit 12 to carry out advantages of the present invention.

Internal shifting hubs, such as internal shifting hub 40, are known in the art. Thus, internal shifting hub 40 will not be discussed or illustrated in detail herein. One example of an internal shifting hub and a shifting assembly, which technology can be used in the present invention, is disclosed in U.S. Pat. No. 5,900,705, assigned to Shimano Inc. The entire disclosure of U.S. Pat. No. 5,900,705 is incorporated herein by reference to understand an internal shifting hub that is connected to an automatic shifting assembly.

Figure 4:
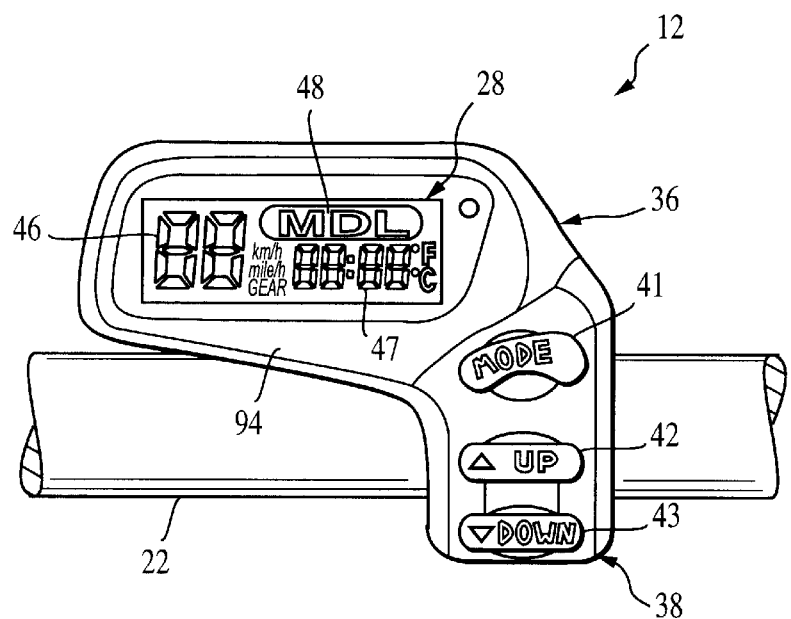
FIG. 4 is a front elevational view of the bicycle display unit of FIGS. 1–3 attached to the handlebars of the bicycle adjacent one of the handgrips.
Figure 5:
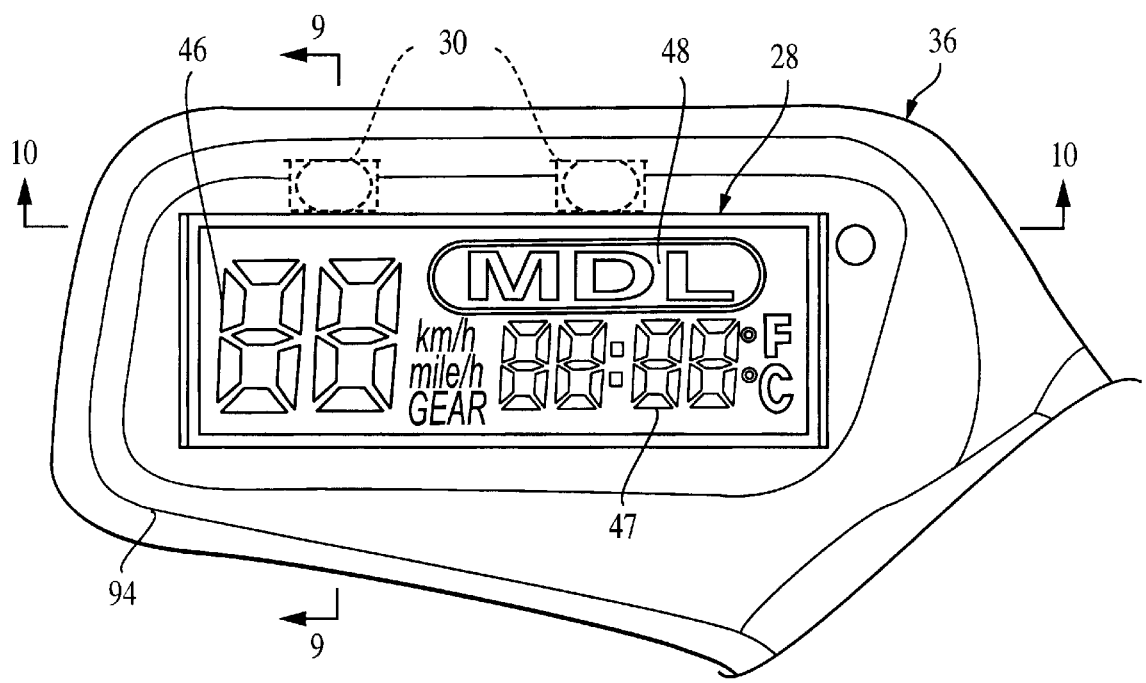
FIG. 5 is a partial, enlarged elevational view of the display panel of the display unit in accordance with the present invention.
Figure 6:
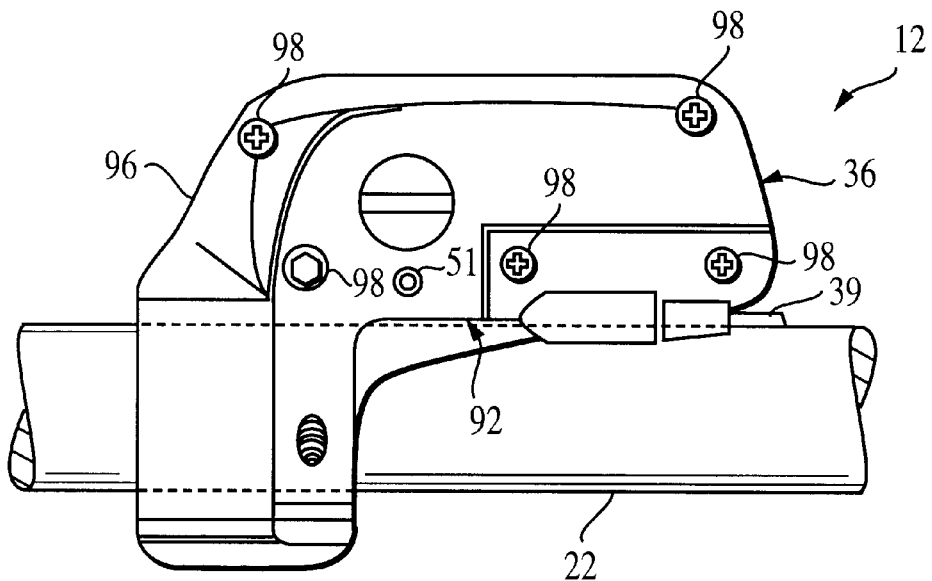
FIG. 6 is a rear elevational view of the display unit illustrated in FIG. 4 in accordance with the present invention.
Figure 7:
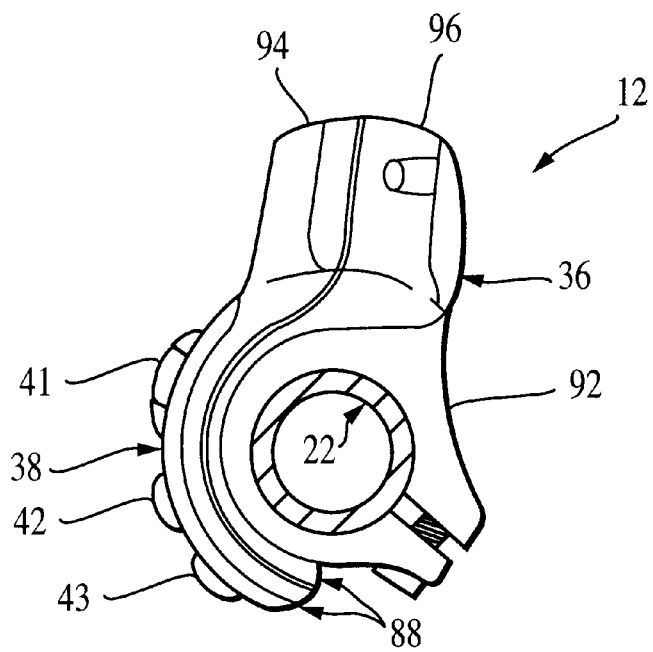
FIG. 7 is a side elevational view of the bicycle display unit illustrated in FIGS. 4–6 in accordance with the present invention.

As seen in FIGS. 4 and 8, shifting assembly 38 has three shifting buttons or switches 41, 42 and 43. Switches 41–43 are preferably push buttons that are operatively coupled to control unit 32 and internal shifting hub 40 for signaling and/or controlling the shifting of internal shifting hub 40. For example, switches 41–43 have cap portions 41a, 42a and 43a and contact portions 41b, 42b and 43b that are formed on ribbon cable 44 that is electrically coupled to control unit 32. Upon pushing switch 41, a signal is sent to control unit 32, which processes the signal, and then control unit 32 either automatically controls the shifting of internal shifting hub 40 or controls the shifting of internal shifting hub 40 in response to the rider pushing one of the switches 42 or 43. Upon pushing one of the switches 42 or 43, a signal is sent to control unit 32, which processes the signal, and then control unit 32 sends a signal to internal shifting hub 40 to up or down shift.

Switch 41 is preferably a mode switch that allows the rider to change between an automatic shift mode and a manual shift mode. Moreover, the automatic shift mode preferably has two or more different automatic modes for different riding conditions. Accordingly, by pressing mode switch 41, the rider can switch between a manual shift mode and either one of the automatic shift modes. When bicycle 10 is not being operated, switches 41–43 can be used with adjustment button 51 to set or adjust control unit 32. Adjustment button 51 is pushed with a pen or point device to activate an adjustment circuit of control unit 32. For example, if the mode switch 41 is held down, the shift switches 42 and 43 can be used to set and/or adjust control unit 32.

When the rider selects the automatic shift mode by pressing mode switch 41, control unit 32 automatically shifts internal shifting hub 40. More specifically, control unit 32 determines the speed of bicycle 10 and the current gear position to determine when to up shift or down shift. Accordingly, control unit 32 has a program stored therein for shifting internal shifting hub 40. Display panel 28 preferably displays the current gear position and speed of bicycle 10. Each time internal shifting hub 40 shifts from a lower gear to a higher gear, or a higher gear to a lower gear, a predetermined operational command or signal is generated and sent to control unit 32. Control unit 32 will then determine if backlights 30 should be illuminated.

When the rider selects the manual shift mode, internal shifting hub 40 is shifted through the operation of control or shift switches 42 and 43. For example, switch 42 is preferably a push button that shifts internal shifting hub 40 from a lower speed step to a higher speed step. Switch 43 is preferably a down shifting push button that signals internal shifting hub 40 to shift to the next lower speed step. Display panel 28 preferably displays which one of the three modes the rider is currently using. Moreover, display panel 28 preferably discloses the current gear of internal shifting hub 40 and the current speed of bicycle 10.

Display panel or member 28 is preferably a relatively conventional display panel such as a liquid crystal display (LCD) which displays various information to the rider. Display panel 28 has a front display surface in which the indicia is displayed for conveying information about bicycle 10 to the rider. The rear side of display panel 28 has an electrical connector 45 that is electrically connected to control unit 32 as explained below. Since display panels 28 are relatively conventional and well known in the art, display panel 28 will not be discussed or illustrated in detail herein. Rather, display panel 28 will only be discussed as needed to understand the present invention.

Display panel 28 preferably includes a main numerical value display portion 46, a secondary numerical value display portion 47 and a mode display portion 48. Of course, it will be apparent to those skilled in the art from this disclosure that fewer or more display portions can be used. Moreover, the display portions can be graphical displays instead of numerical or alphanumerical displays.

Preferably, the main numerical value display portion 46 is preferably designed to at least selectively display such information as kilometers per hour (km/h), or miles per hour (mile/h), or gear position. In other words, main value display portion 46 preferably provides information regarding the current bicycle speed and the current gear selection. Of course, main value display portion 46 can selectively provide other types of information as needed and/or desired. Main value display portion 46 is operatively coupled to control unit 32. Preferably, control unit 32 automatically alternates between displaying the current bicycle speed for a predetermined period of time and displaying the current gear position for a predetermined period of time.

Secondary value display portion 47 preferably gives information, such as a current time, a current temperature, a trip time and a trip distance. Of course, secondary value display portion 47 can selectively provide other types of information as needed and/or desired. Control unit 32 is operatively coupled to secondary value display portion 47. Preferably, control unit 32 automatically alternates the displayed information after a predetermined period of time has lapsed. Alternatively, an additional button may be operatively coupled to control unit 32 to selectively change the currently displayed information.

Preferably, mode display portion 48 utilizes alphanumeric characters to indicate the current mode of bicycle 10. For example, "M" can be utilized to indicate a manual mode, while "D" and/or "L" can be utilized to indicate the automatic shifting mode. Of course, it will be apparent to those skilled in the art from this disclosure that other types of indicators, characters or graphics can be utilized to indicate the current mode. Mode display portion 48 is operatively coupled to control unit 32 for displaying the current mode.

It will be apparent to those skilled in the art from this disclosure that various configurations for display panel 28 are possible, and that display panel 28 can be configured to display the various information outputted from control unit 32. Some examples of prior art bicycle displays, which are known in the bicycle art, include U.S. Pat. Nos. 5,847,641 and 5,625,336 both of which are assigned to Shimano Inc. These patents are incorporated herein by reference to show various circuits that may be utilized in control unit 32 and/or various information that may be displayed by display unit 12.

Control unit 32 preferably includes one or more backlights 30 that are operatively coupled thereto. These backlights 30 are preferably light emitting diodes (LED) or other conventional lighting units or elements. Backlights 30 arc preferably positioned such that the light illuminates across the front surface of display panel 28. Excessive use of backlights 30 can typically drain battery unit 34 such that display unit 12 does not function. In order to optimize use of backlights 30, control unit 32 determines when and how backlights 30 are illuminated.

Control unit 32 controls an internal backlight switch command 52 for controlling the energy being supplied to backlights 30 and various parts of control unit 32. Preferably, control unit 32 controls internal backlight switch command 52 to automatically turn "off" backlights 30 upon lapse of a predetermined time period after internal backlight switch command 52 turns "on" backlights 30. Preferably, control unit 32 also controls internal backlight switch command 52 to prevents backlights 30 from being turned "on" during a pre-selected time interval or intervals, such as daylight hours. This predetermined time interval can be called a "blackout period". The phrase "blackout period" as utilized herein, refers to a period of time in which backlights 30 cannot be illuminated either manually or automatically.

This pre-selected time interval or blackout period can be set by the factory and/or by the rider. For example, control unit 32 may include a program that requires the rider to input the current time, current date and current time zone, such that control unit 32 optimizes the length and timing of the blackout period. In other words, control unit 32 would automatically adjust for daylight savings time, as well as the geographic location of the rider. Of course, this assumes that the rider correctly inputs the current time, date and geographic location in which the rider is located.

Alternatively, the rider can program the blackout period. For example, the rider could input that the blackout period is from 6:00 a.m. to 8:00 p.m. Of course, to prevent backlights 30 from coming "on" during daylight hours, this would require the rider to constantly adjust the display unit to optimize the blackout period.

Another possibility is to utilize a light sensor 54 to control the blackout period. The light sensor 54 would determine when the surrounding light level drops below a predetermined level, and thus, allows backlights 30 to be illuminated. In this case, the blackout period can occur any time that the surrounding light level is sufficient to view the indicia on display panel 28. Of course, it will be apparent to those skilled in the art from this disclosure that various combinations of these methods can be utilized for determining the blackout period.

It is desirable to have backlights 30 illuminate without the rider having to press a separate button to illuminate backlights 30. Of course, it is possible to add such a separate button to illuminate backlights 30, if needed and/or desired. Of course, if a separate button is utilized, this button should be inoperable during the blackout period so as to prevent accidental or inadvertent illumination of backlights 30 during daylight hours.

Preferably, backlights 30 are only illuminated for very short periods of time. The period of illumination of backlights 30 is preferably in the range of two to five seconds. Of course, the longer backlights 30 are illuminated, the more energy is being drained from the battery unit 34. In any event, backlights 30 should never operate for a period of more than approximately thirty (30) seconds.

The length of time in which backlights 30 remain "on" is preferably adjustable by the rider. This will allow the rider to optimize the display unit to meet his or her needs. Backlights 30 can be illuminated in a variety of manners. For example, each time the shifting assembly 38 detects a shift, a signal is produced and sent to control unit 32 such that backlights 30 will illuminate. Backlights 30 will remain "on" for a predetermined amount of time as determined by control unit 32. In other words, backlight switch command 52 will automatically turn "off" backlights 30 upon lapse of a predetermined time period after switching backlights 30 "on".

This illumination of backlights 30 during the shifting operation preferably occurs when shifting assembly 38 is either operating in the manual or the automatic mode. Moreover, preferably backlights 30 illuminate with each upshift or downshift. Of course, it will be apparent to those skilled in the art from this disclosure that backlights 30 could be illuminated only on upshifts, or only on downshifts, or only after a predetermined number of shifts.

Alternatively, backlights 30 can be illuminated each time the mode button or switch 41 is pressed which changes between one of the automatic modes or from one of the automatic modes to the manual mode, or vice versa. Another possibility would be to have control unit 32 control the illumination of backlights 30 based on time. In particular, backlights 30 could be turned on every five minutes for the predetermined period of time. Upon the lapse of the predetermined period of time, backlights 30 are again extinguished. The frequency in which backlights 30 are turned "on" can be preset at the factory and/or can be adjusted by the rider. Of course, in each of these alternative embodiments, backlights 30 should be inoperable during the blackout period so as to prevent accidental or inadvertent illumination of backlights 30 during daylight hours.

Control unit 32 includes a microcomputer formed on a printed circuit board 60 that is powered by battery unit 34. In the illustrated embodiment, backlights 30 are attached directly to the forwardly facing surface of printed circuit board 60. Of course, backlights 30 can be separated from printed circuit board 60. The microcomputer of control unit includes a central processing unit (CPU) 62, a random access memory component (RAM) 64, a read only memory component (ROM) 66, and an I/O interface 68. The various components of the microcomputer are well known in the bicycle field. Therefore, the components used in the microcomputer of control unit 32 will not be discussed or illustrated in detail herein. Moreover, it will be apparent to those skilled in the art from this disclosure that control unit 32 can include various electronic components, circuitry and mechanical components to carryout the present invention.

Control unit 32 further includes a plurality of sensing/ measuring devices or components that are coupled thereto to provide various information to central processing unit 62. The sensing/measuring components generate predetermined operational commands. Typically, the predetermined operational commands have an analog value. A signal transmission circuit of central processing unit 62 performs an analog to digital conversion and sends the result to display panel 28. Thus, these sensing/measuring components are operatively coupled to central processing unit 62 of control unit 32 such that predetermined operational commands are received by central processing unit 62. In other words, the predetermined operational commands are processed by central processing unit 62. Information based on the predetermined operational commands is then displayed on display panel 28 as determined by central processing unit 62. The predetermined operational commands are also used to signal central processing unit 62 to turn "on" backlights for a predetermined period of time.

One type of sensing/measuring component that is used to control backlights 30 is an operating or gear position sensor 70. Operating or gear position sensor 70 has a potentiometer that is operatively coupled to central processing unit 62 for sensing the current gear position of internal shifting hub 40. Gear position sensor 70 can be mounted to internal shifting hub 40 in a conventional manner. In the case of a manual transmission, a gear position sensor can be mounted to each shifting assembly and/or to the front and rear derailleurs. The gear position sensor 70 produces an analog signal (a predetermined operational command) that is converted to a digital signal by a signal conversion circuit of central processing unit 62. The digital signal is then sent to display panel 28. The predetermined operational command of gear position sensor 70 is also used to control backlights 30.

Another type of sensing/measuring component that is used to control backlights 30 is a bicycle speed sensor 72. Bicycle speed sensor 72 is coupled to the front fork of bicycle 10. This bicycle speed sensor 72 outputs a bicycle speed signal by detecting a magnet 74 mounted on the front wheel 16. Thus, sensor 72 and magnet 74 form a device or measuring component of control unit 32. In other words, sensor 72 detects the rotational velocity of the front wheel 16 and has a front lead switch or other component for detecting one or more magnets 74 rotating with the wheel 16. Sensor 72 generates a pulse each time wheel 16 has turned a pre-described angle or rotation. As soon as sensor 72 generates the pulse or signal, a pulse signal transmission circuit sends this pulse signal to central processing unit 62, which then displays the information on display panel 28 as needed. In other words, bicycle speed sensor 72 produces an analog signal (a predetermined operational command) that is converted to a digital signal by a signal conversion circuit of central processing unit 62. The digital signal is then sent to display panel 28. The predetermined operational command of bicycle speed sensor 72 is also used to control backlights 30.

A torque sensor 76 can be utilized to detect the pedaling force of the rider or the torque acting on the bottom bracket axle. The crank arms can be provided with a cadence sensor similar to speed sensor 72, which is installed on the front fork. The shifting mechanism and braking mechanisms can also be provided with positional sensors and a transmission circuit for indicating various information about the shifting and/or braking. For example, a strain gauge or other force sensor can be used to detect the pressure exerted on the brake block or other frictional member. Torque sensor 76 produces an analog signal (a predetermined operational command) that is converted to a digital signal by a signal conversion circuit of central processing unit 62. The digital signal is then sent to display panel 28.

A brake sensor 78 can be utilized to detect when a braking force is applied by the brakes. Brake sensor 78 is coupled to the brake lever 79. Brake sensor 78 produces an analog signal (a predetermined operational command) that is converted to a digital signal by a signal conversion circuit of central processing unit 62. The digital signal is then sent to display panel 28. The predetermined operational command of brake sensor 78 is also used to control backlights 30. In other words, each time the brakes are applied by brake lever 79, backlights 30 will be illuminated for a predetermined period of time.

Another sensing/measuring component that can be included in control unit 32 is a timing device or timing component 80. Preferably, timing component 80 includes a clock, which displays the current time on display panel 28. Timing component 80 is also utilized for measuring various timing sequences and for controlling the information being displayed on display panel 28. For example, timing component 80 is used to control the "blackout period" and the amount of time in which backlights 30 are illuminated. A predetermined operational command is also produced by timing component 80 to control backlights 30 based on time.

It is also possible to install other types of sensors for measuring the rider's pulse, blood pressure and the like. These parameters can also be displayed on display panel 28 via control unit 32. A temperature sensor (not shown) is also preferably operatively coupled to control unit 32 for display current temperature on display panel 28. Display unit 12 and the sensors with their respective signal transmission circuits are connected to each other with the aid of conventional conductor signal power cables for connectors.

For example, various information may be alternately displayed upon lapse of a predetermined amount of time as disclosed in U.S. Pat. No. 5,625,336, which is assigned to Shimano Inc. Specifically, U.S. Pat. No. 5,625,336 discloses a display apparatus for a bicycle having a speed changer in which the display automatically switches the display device from a shifting mode to a running mode upon lapse of a predetermined time after switching of the display device to the shifting mode. This type of display can be utilized in the present invention. The entire disclosure of U.S. Pat. No. 5,625,336 is hereby incorporated by reference for understanding the various features that can be utilized in the present invention. Of course, other bicycle components can also be equipped with sensors for detecting various value detections and with signal transmitting circuits for transmitting the detected signals through the outputted to the display unit.

Battery component or unit 34 preferably includes a conventional low voltage battery, such as those utilized in digital watches. While only one battery is illustrated, it will be apparent to those skilled in the art from this disclosure that more than one battery may be utilized if needed and/or desired. Moreover, it will be apparent to those skilled in the art from this disclosure that the battery or component 34 can be mounted within the housing 36 as illustrated, or the battery component 34 may be mounted in a separate housing and electrically coupled to control unit 32 in a conventional manner. Battery component 34 can be a conventional battery such as a silver oxide battery or a lithium battery or any other known types of low voltage battery. Preferably, the voltage is about 1.5 volts. It will also be apparent to those skilled in the art from this disclosure that the battery component can be a solar battery, or can be a combination of a standard dry battery and a solar battery connected together.

Housing 36 preferably includes an outer casing 88, an inner casing 90 and a mounting bracket 92. Preferably, outer and inner casings 88 and 90 and bracket 92 are constructed of lightweight materials. More preferably, outer and inner casings 88 and 90 are constructed of a hard rigid plastic material, while bracket 92 is constructed of a metallic material such as aluminum.

Outer casing 88 preferably includes a front outer casing portion 94, a rear outer casing portion 96 and a plurality of fasteners 98 for enclosing inner easing 90 therein. The outer easing 88 is fixedly coupled to bracket 92 by fasteners 98. The front and rear outer casing portions 94 and 96 form a hollow cavity for supporting inner casings therein. The front outer casing portion 94 has a display opening 100 as well as three button openings 101, 102 and 103. The rear outer casing portion 96 mates with front outer easing portion 94 and is coupled thereto by the fasteners 98.

Inner casing 90 preferably includes a lens or front inner casing portion 106, a liquid crystal display holder 108 and a rear inner casing portion 110. Font inner casing portion 106, LCD holder 108 and rear inner casing portion 110 are preferably bonded together so as to form a single unit that is secured within outer casing 88. The inner casing 90 holds display panel 28 and printed circuit board 60 therein. In other words, inner casing 90 houses display panel 28, battery unit 30 and control unit 32 therein. The front inner casing portion or lens 106 is a transparent member that overlies main display opening 100 in front outer casing portion 94 so that the front surface of display panel 28 can be viewed through outer and inner casings 88 and 90.

When lens or front inner casing portion 106 is located against the front outer casing portion 94, lens 106 is positioned adjacent a reflective surface 112 formed on an inner portion of front outer casing portion 94. This reflective surface 112 is designed to reflect light illuminated from backlights 30 along the front surface of display panel 28. In other words, backlights 30 are arranged on printed circuit board 60 such that the light illuminates into the lens and is then reflected throughout the lens by the reflective surface 112 of front outer casing portion 94.

Printed circuit board 60 has a ribbon cable with switches formed thereon. These switches preferably have switch caps that are located in the button openings of the front outer casing portion. Preferably, various indicia are formed on each of the switch caps that correspond to their function. For example, the switch caps have the words "MODE", "UP" and "DOWN" imprinted thereon. The switch caps protrude out from the switch or button openings in the front outer casing portions such that the rider can push the switch caps inwardly which in turn causes the switches to open or close.

Second Embodiment

Referring now to FIG. 12, a modified display unit 112 is illustrated in accordance with a second embodiment of the present invention. Basically, this embodiment is substantially identical to the first embodiment except that the various components or parts have been divided into three separate members. In view of the similarities between this embodiment and the prior embodiment, this embodiment will not be discussed or illustrated in detail herein. In other words, the various descriptions and functions of the prior embodiments are identical or substantially identical to the prior embodiment of the present invention unless otherwise stated.

In this embodiment, display unit 112 has a display unit housing 113 electrically connected to a control unit housing 115 via a cable 117. Control unit housing 115 is fastened to the handlebars 122 and is electrically connected to the display panel 128 via cable 117. The control unit housing 115 includes the printed circuit board of the first embodiment. However, the backlights 30 have been remotely connected to the printed circuit board of the control unit housing 115. In other words, the backlights are mounted in the display panel housing 113. Thus, the display unit housing 113 can be located adjacent the center of the handlebar 122.

Moreover, in this embodiment, the automatic shifting has been eliminated and replaced with the shifting assembly 138 which is any known manual shifting assembly. In this embodiment, the shifting assembly 138 utilizes a pair of levers 139 that operate a cable 141 that is connected to either a front derailleur or a rear derailleur. It will be apparent to those skilled in the art from this disclosure that the lever type of shifting assembly 138 can be substituted with a grip shifting type of shifting mechanism if needed and/or desired. In any event, the gear position sensor senses the current gear positions of the shifting assembly 138.

Third Embodiment

Referring now to FIG. 13, a modified display unit 212 is illustrated in accordance with a third embodiment of the present invention. Basically, this embodiment is substantially identical to the first embodiment, except that the automatic shifting assembly has been replaced with a mechanical shifting assembly 138 of the second embodiment. In view of the similarities between this embodiment and the prior embodiments, this embodiment will not be discussed or illustrated in detail herein. In other words, the various descriptions and functions of the prior embodiments are identical or substantially identical to the prior embodiment of the present invention unless otherwise stated.

Fourth Embodiment

Referring now to FIG. 14, a modified display unit 312 in accordance is illustrated with a fourth embodiment of the present invention. This embodiment is basically identical to the first embodiment, except that the control buttons 341, 342 and 343 have been mounted on a separate housing 315 from the main housing 336. In view of the similarities between this embodiment and the prior embodiment, this embodiment will not be discussed or illustrated in detail herein. In other words, the various descriptions and functions of the prior embodiments are identical or substantially identical to the prior embodiment of the present invention unless otherwise stated.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A bicycle display unit comprising:

a display member;

a backlight arranged to illuminate said display member for viewing said display member;

a backlight switch command operatively coupled to said backlight to selectively turn said backlight on and off, said backlight switch command turning on said backlight in response to a predetermined operational command; and a control unit being operatively coupled to said backlight switch command to automatically turn off said backlight upon lapse of a predetermined time period after said backlight being turned on, said predetermined time period being less than 30 seconds, said control unit preventing said backlight from being turned on during a selected time interval even if said predetermined operational command is received.

2. A bicycle display unit according to claim 1, further comprising a measuring device connected to said display member to output information on said display member.

3. A bicycle display unit according to claim 2, wherein said measuring device includes a timing device that produces said predetermined operational command to signal said backlight to be turned on.

4. A bicycle display unit according to claim 1, further comprising a battery unit electrically coupled to said backlight to supply electrical energy thereto.

5. A bicycle display unit according to claim 1, wherein said display member and said backlight are mounted to a housing which has a mounting member.

6. A bicycle display unit according to claim 1, wherein said control unit includes a microprocessor.

7. A bicycle display unit according to claim 1, wherein said control unit is operatively coupled to a bicycle shifting assembly that produces said predetermined operational command during a shifting operation to signal said backlight to be turned on.

8. A bicycle display unit according to claim 7, wherein said bicycle shifting assembly includes at least one shifting member with said predetermined operational command being produced by operation of said at least one shifting member.

9. A bicycle display unit according to claim 7, wherein said bicycle shifting assembly includes an automatic mode that automatically shifts gears and produces said predetermined operational command.

10. A bicycle display unit according to claim 1, wherein said control unit is operatively coupled to a bicycle shifting assembly that produces said predetermined operational command during a mode changing operation.

11. A bicycle display unit according to claim 1, wherein said control unit has an adjustment to change the length of said selected time interval.

12. A bicycle display unit according to claim 1, wherein said selected time interval of said control unit is factory preset.

13. A bicycle display unit according to claim 1, wherein said predetermined time period is between one seconds and six seconds.

14. A bicycle display unit according to claim 1, wherein said control unit has an adjustment to change the length of said predetermined time period.

15. A bicycle display unit according to claim 1, wherein said display member has a display surface for displaying information and said backlight is arranged to indirectly illuminate said front display surface for viewing said information displayed thereon.

16. A bicycle display unit according to claim 1, wherein said display member is an LCD display.

17. A bicycle display unit according to claim 1, further comprising a bicycle shifting assembly operatively coupled to said control unit to display shifting information on said display member.

18. A bicycle display unit according to claim 17, wherein said bicycle shifting assembly includes at least one shifting member with said display member, said backlight and said bicycle shifting assembly being mountable on a bicycle.

19. A bicycle display unit according to claim 18, wherein said shifting member, said backlight, said display member and said bicycle shifting assembly being mounted together in a housing.

20. A bicycle display unit according to claim 18, wherein said shifting member, said backlight, said display member and said control unit being mounted together in a housing.

21. A bicycle display unit according to claim 18, wherein said backlight, said display member and said control unit being mounted together in a first housing, while said shifting member is mounted in a second housing.

22. A bicycle display unit according to claim 2, wherein said measuring device includes a speed determining component.

* * * * *